April 19, 1966 O. F. HAMANN ETAL 3,247,514
MICROWAVE IDENTIFICATION OF RAILROAD CARS
Original Filed Oct. 4, 1963 3 Sheets-Sheet 2
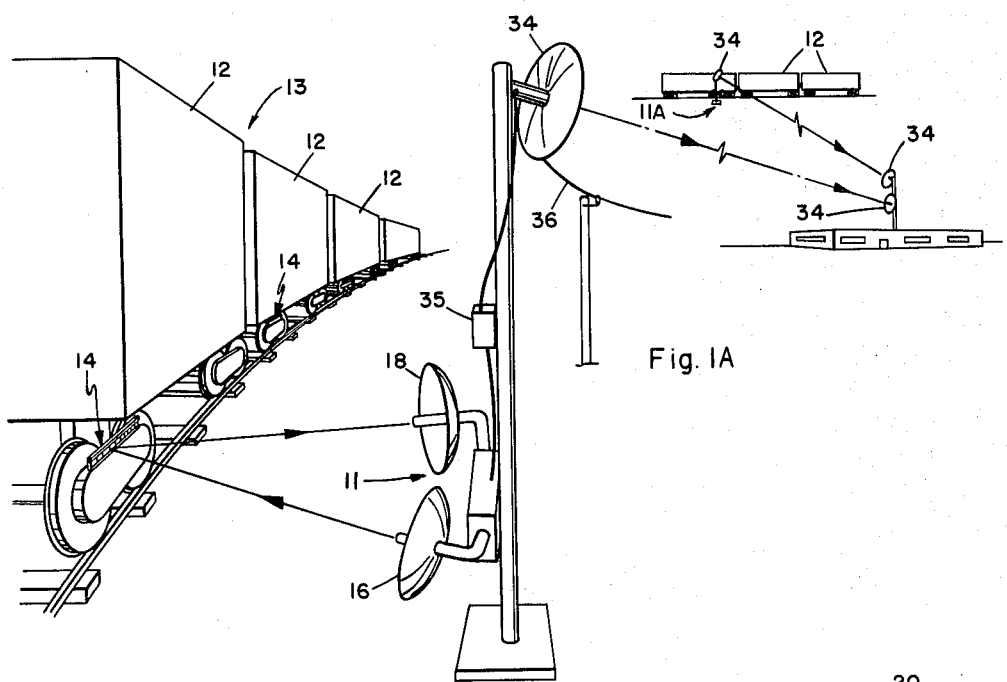
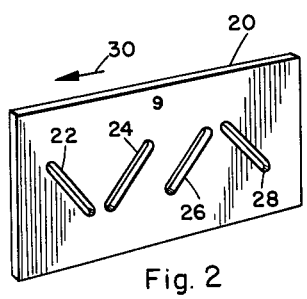
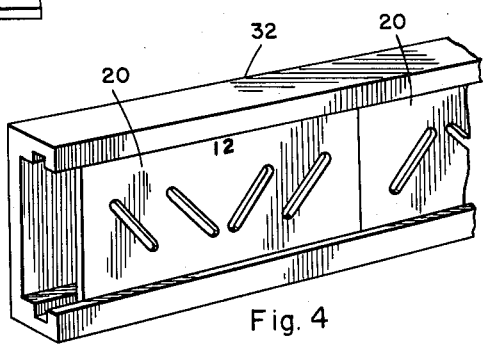
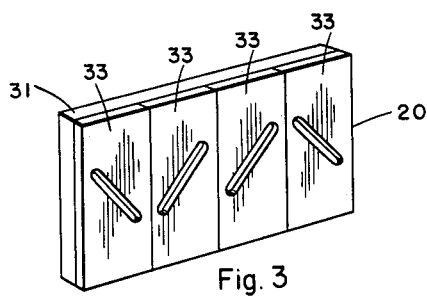
INVENTORS
OMER F. HAMANN
SHERMAN H. BOYD
BY
*Wallace, Kinzer & Dorn*
ATT'YS.

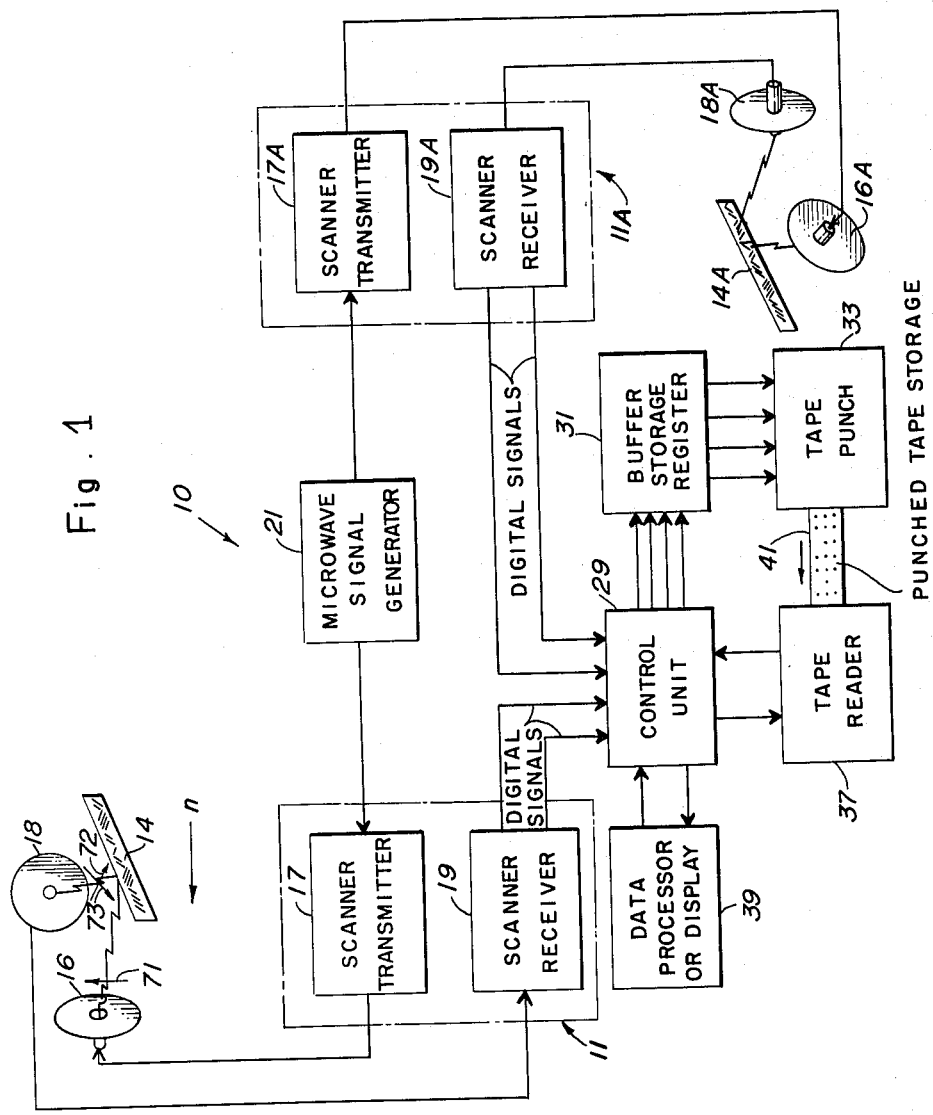

April 19, 1966    O. F. HAMANN ETAL    3,247,514
MICROWAVE IDENTIFICATION OF RAILROAD CARS Original Filed Oct. 4, 1963    3 Sheets-Sheet 3

INVENTORS
OMER F. HAMANN
SHERMAN H. BOYD
BY Wallace, Kingery & Dorn
ATT'YS.

United States Patent Office 3,247,514
Patented Apr. 19, 1966

3,247,514
MICROWAVE IDENTIFICATION OF RAILROAD CARS
Omer F. Hamann, La Jolla, and Sherman H. Boyd, San Diego, Calif., assignors to American Brake Shoe Company, New York, N.Y., a corporation of Delaware
Original application Oct. 4, 1963, Ser. No. 319,914. Divided and this application Oct. 5, 1965, Ser. No. 493,163
10 Claims. (Cl. 343—18)

This application is a division of co-pending application Serial No. 319,914, filed October 4, 1963, which in turn is a continuation-in-part of application Serial No. 160,004, filed December 18, 1961, and now abandoned.

This invention relates to new and improved identification members for use in a system for identifying railway cars and other large objects, and more particularly in an improved automatic all-weather microwave car identification system.

It is critically important for railroad management to know, at all times, the locations of the locomotives and cars belonging to a railroad system. If a car is loaded, information as to its location enables the railroad to answer questions from the shipper or shippers; if the car is empty, information as to its location is essential to enable the car to be put into use when needed. Because both locomotives and cars require periodic service, information as to their location is also important for this purpose.

Maintenance of a running record of the location of the cars, locomotives, and other like equipment is made difficult because the individual cars may be diverted to any of a plurality of locations and may remain there for long periods of time. By the same token, a car shunted to an isolated siding may remain there for an indefinite period if no adequate record of its location is maintained. In most instances, records of car locations have been maintained primarily by hand-written memoranda prepared by checks in the larger yards and by other personnel in small yards and at individual sidings. As might be expected, this kind of reporting is subject to human error and is also subject to a substantial time lag insofar as preparation and forwarding of records is concerned.

The need to mechanize the reporting and recording of car and locomotive location information has been recognized, in the railroad industry and in other similar fields for some time. A number of suggestions that have been advanced with respect to automatic identification systems have proved impractical because they require overly complex and expensive equipment on the cars themselves. Other systems, although attractive from an economic standpoint, have not proved desirable because they are not effectively operable under adverse environmental conditions such as rain, fog, or storms. Indeed, many systems relying upon visual recognition of car numbers and other identifying data painted on the cars themselves have been difficult to keep in operation because the symbols tend to be obscured by dirt on the cars. Moreover, many such systems still require manual entries and reports and thus do not accomplish complete automation of the car identification procedure.

There are distinct economic limitations with respect to any system adopted with respect to automatic identification of railroad cars and other vehicles. One problem presented in connection with such systems has to do with the large number of cars. Thus, any car identification system requiring the mounting of any equipment of substantial complexity on the individual cars is quite impractical from an economic standpoint. From a purely economic point of view, the cost of the individual identification elements on the cars must be kept below ten dollars and preferably should be less than five dollars. Accordingly, the use of active circuit elements such as amplifiers and transmitters, or storage devices such as magnetic cores, magnetic tape, or the like, on the railroad cars, is out of the question because of excessive cost. Optical systems with painted marks on the cars, as noted above, are objectionable because they are not reliable during rain, snow, fog, or excessive dust conditions. The same considerations, in whole or in part, apply to other object identification applications; e.g., automobiles, trucks and like vehicles.

The principal object of the present invention, therefore, is to provide novel coded identification members, suitable for use in automatic railroad car and other object identification systems, that effectively overcome the difficulties and disadvantages of previously known apparatus.

Another important object of the present invention is to provide, in an automatic railway car or like object identification system, identification devices, mounted on the cars, consisting solely of passive elements that can be readily and inexpensively mass produced.

A particular object of the invention is to provide new and improved passive code elements capable of modifying and reflecting a received microwave or other radiant energy signal in a manner affording a reliably high signal-to-noise level at a receiver positioned to pick up the reflected signals.

Another object of the invention is the utilization of a shift in polarization as a basis for distinguishing the reflected code signals from the original signal and from stray reflections. An important feature of the invention, in this regard, is the employment of resonant reflector elements as the coded identification devices.

Accordingly, the present invention relates to a coded identification member for use in an automatic object identifying system, such as a vehicle identifying system, of the kind comprising a scanning station including a source of radiant energy signals of given wavelength, radiating means for radiating said signals with a first predetermined polarization, and receiving means for receiving signals of that wavelength but limited to reception of signals of a second and substantially different polarization. The identification member comprises a plurality of individual reflector elements arranged in a predetermined code sequence, each effective to reflect impinging signals of the aforesaid wavelength but with said second polarization. The identification member further comprises means for mounting the reflector elements on an object to be identified in position to intercept and re-radiate the signals from the radiating means back to the receiving means when that object is in predetermined position relative to the scanning station.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a block diagram of a railway car identifying system in which the present invention may be employed;

FIG. 1A is a partially schematic perspective view of a trackside scanning station for the system of FIG. 1, showing the operational relationship of the scanning station to the railway cars being identified;

FIG. 2 is a perspective view of one embodiment of a coded reflector member, constructed in accordance with one embodiment of the present invention, used in the system of FIG. 1;

FIG. 3 is a perspective view of another embodiment of the coded reflector member of the invention;

FIG. 4 is a perspective view of a plurality of reflector members assembled to form a coded object identification member;

Figure 5:
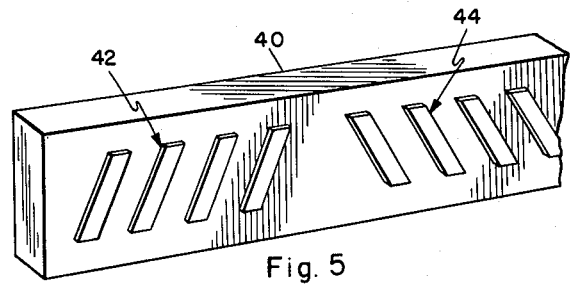
FIG. 5 is a perspective view of yet another embodiment of the coded reflector member of the invention.

FIGS. 1 and 1A illustrate an automatic railway car identifying system 10. The system 10 includes a first trackside scanning station 11 and a second and similar trackside scanning station 11A. At station 11, as shown in FIGS. 1 and 1A, there is located a transmitting antenna 16, connected to a scanner transmitter 17, and a receiving antenna 18 that is connected to a scanner receiver 19.

A train 13 moving past the scanning station 11 (FIG. 1A) brings each individual car 12 into scanning position opposite the scanning station. Each car 12 carries an identification member or plate 14, comprising a plurality of coded reflector members, attached to the car at a suitable location coinciding approximately with the common focus of the two antennas 16 and 18. One suitable location for the identification plates 14, on the railway cars 12, is on the wheel carriage immediately above the springs, since this location is relatively well standardized with respect to height above the railway track. On those relatively few cars where this particular location cannot be used, as on cars on which it is masked by some downwardly projecting exterior element of the car, a different mounting arrangement may be employed, so long as the identification members on the cars are located at approximately constant heights relative to the antennas. The location of the identification members 14 lengthwise of the cars 12 is not critical; either truck may be selected or the plates may be mounted at the mid-points of the cars. Preferably, there are two plates 14 for each car, one on each side, so that it is not necessary to duplicate the scanning station 11 on the opposite side of the railway track.

The scanning station 11A constitutes, essentially, a duplicate of station 11. Thus, it includes a scanner transmitter 17A connected to a radiating antenna 16A (FIG. 1). The scanning station also includes a receiving antenna 18A that is connected to a scanner receiver 19A. In actual practice, in the system 10 as illustrated, each of the receiving antennas 18 constitutes a dual antenna structure capable of discriminating between received signals of two distinct polarizations.

In the operation of the car identification system 10, the selection of operating frequency is of substantial importance. Optimum results are obtained when the scanning signals employed at the scanning stations, such as stations 11 and 11A, are in the microwave range of five to forty kilomegacycles. That is, the scanning signals should be in a frequency range having wavelengths between 0.75 and 6.0 centimeters. This particular operating range of microwave signal frequencies produces the desired resolution for code signals reflected by the coded reflector members of the identification members 14, which are described in detail hereinafter. The identification plates 14 may be held to a reasonable size when utilizing signals in this particular range. Further, the microwave signals within the stated range may be conveniently transmitted by available equipment tested and proven by substantial commercial use.

One form of coded reflector member that may be utilized in the construction of one of the identification members 14 is illustrated in FIG. 2. The coded reflector member 20 comprises a sheet of conductive material, such as a thin aluminum sheet, having a fairly smooth surface and having a plurality of slots, 22, 24, 26 and 28 formed therein. These slots are each equal in length to one-half the wavelength of the microwave signal radiated by antenna 16. Thus, said slot constitutes a dipole reflector element resonant at the operating frequency of the system. The slots 22, 24, 26, 28 may be grouped according to orientation, orientation of the slots being critical in operation of the system as described more fully hereinafter. In the illustrated arrangement, the slots 24 and 26 represent code "zeros" and are oriented at −45° to the vertical. The slots 22 and 28, on the other hand, constitute code "ones" and are each oriented at an angle of +45° to the vertical. It is thus seen that the code for the reflector member 20, in binary notation, is 1001, and is equivalent to the decimal numeral nine.

In system 10, the microwave scanning signal from the transmitter antenna 16 at station 11 (FIG. 1) is radiated with a vertical polarization, upwardly directed, as indicated by arrow 71. This signal, impinging upon one of the "one" slots 22 or 28 of the reflector element 20 (FIG. 2) is reflected and re-radiated with a different polarization, in this instance at an angle of +45° relative to the original vertical polarization.

On the other hand, the same microwave signal impinging upon the portion of the conductive reflector 20 including the dipole 24 or the dipole 26 is reflected and re-radiated with a polarization rotation of −45° to the vertical. Thus, the signal from antenna 16 is reflected toward the dual receiving antenna 18 with a rotation of polarization of either plus or minus 45° as shown by the arrows 72 and 73 in FIG. 1. The dual antenna 18 includes two receiving wave guides for distinguishing between received signals that are horizontally polarized in directions thus displaced by 90°. It is thus seen that the angled dipole slots 22–28 act as selective re-radiators and constitute effective code elements for the identification system.

Utilizing microwave signals in the range of wavelengths from 0.75 to 6.0 centimeters, the dipole slots 22, 24, 26, 28 should have a length of 0.375 to 3.0 centimeters, depending upon the particular frequency selected for microwave scanning. The width of each dipole should be less than one-quarter of the operating wavelength and preferably should be about one-tenth of that wavelength. Furthermore, the dipoles should be spaced from each other by a distance of one full wavelength or more. These dimensions permit each reflector member 20 to be quite small; more particularly, the individual reflector member, carrying either four or five dipole reflector elements, may be of the order of two inches in height and less than four inches in length.

It will be recognized that more than one of the reflector members 20 is required to afford complete identification of a given railway car or like vehicle. In a typical arrangement, the railroad owning the car and the specific car itself may be identified by a code combination comprising, for example, three letters and six decimal numerals. The letters can each be fully represented by one reflector member containing a total of five dipole reflector elements such as the slots 22–28, since a five-digit code gives full identification of the letters of the alphabet with additional code symbols to spare. As many as six numerical code elements may be required to identify the individual cars of a given railroad and these can be encompassed, for each numeral, by a reflector member including four individual dipoles. Thus, with reflector members of less than four inches in length, it is seen that the complete car identification data may be assembled in an identification plate having a total length of less than thirty-six inches.

In the car identification system 10, each of the scanning stations such as stations 11 and 11A may include a complete microwave signal generator with a local power supply. In a relatively compact yard, on the other hand, the cost of identification system installation may be reduced, in at least some instances, by utilizing a single microwave signal generator coupled to two or more of the trackside scanning stations. An arrangement of this kind is illustrated in FIGS. 1 and 1A, with a single microwave signal generator 21 coupled to the two scanner transmitters 17 and 17A to provide those transmitters with the necessary microwave signal for radiation. With this arrangement, the transmitters at the scanning stations need be nothing more complex or expensive than relatively simple amplifiers.

Using a single centralized microwave signal generator, as shown in the block diagram of FIG. 1, a number of different methods may be employed to couple the signal generator to the various scanning stations of the system. For example, and as shown in FIG. 1A, the microwave signal may be supplied to the transmitters through a conductive link 36. On the other hand, the microwave information may be transmitted to and from the central station of the system by means of a suitable radiation link as exemplified by the antennas 34. The illustrated arrangement, utilizing a single signal generator for several scanning stations, has the advantage that only passive transmission elements or simple amplifiers are required in the field, facilitating maintenance and servicing of the microwave equipment. On the other hand, it is quite possible and practical to locate individual microwave signal generators at the trackside scanning station and this arrangement may well be adopted.

As shown in FIG. 1, each of the scanner receivers 19, 19A, at the scanning stations are coupled to a control unit 29 at a centralized location for the system. The coupling from the receivers to the control unit 29 may transmit the received signals without change. Alternatively, a suitable detector circuit 35 (FIG. 1A) may be interposed between the receiving antenna and the control unit, constituting a part of the receiver circuits 19 (FIG. 1). Transmission from the trackside scanning stations to the centralized control unit may be by means of a wire circuit or by a radiation link.

The control unit 29 is coupled to a buffer storage register 31 which, in turn, may be connected to a tape punch 33. The binary coding or other code employed for the car identification system may correspond directly to the code required for operation of a conventional tape punch unit. Alternatively, the storage register 31 may include code translation apparatus to translate the received signals into a code compatible with the tape punch. The tape from punch 33 may be fed to a tape reader 37 connected back to the control unit 29. A data processing apparatus or display unit 39 is connected to the control unit and is utilized to perform any desired computations with respect to the car identification data made available by the system and to display such data when required.

In operation of the system 10 shown in FIGS. 1 and 1A, a microwave signal of selected frequency is supplied by signal generator 21 to the scanning transmitter circuit 17 at the trackside scanning station 11. This signal is applied to transmitting antenna 16 and preferably is radiated continuously by that antenna. In any event, this microwave signal is broadcast at all times when it is desired to identify rolling stock moving past the scanning station. As noted above, the radiated signal is vertically polarized.

When a car, locomotive, or other railway vehicle passes through the scanning station 11, the radiated microwave energy from antenna 16 is reflected back to the receiving antenna 18 by each car. Inevitably, there is a substantial amount of stray reflected radiation. The stray reflected radiation from the trucks and other parts of the cars does not produce signals of substantial amplitude in the electrical receiving circuits connected to the receiving antenna 18 because such stray reflected signals retain, for the most part, the vertical polarization employed for the radiated signals, whereas the receiving antenna structures of the device 18 are sensitive only to radiations polarized at plus or minus 45° to the vertical, and afford a high rejection of vertically polarized signals.

When the microwave beam impinges upon one of the dipole slots of a coded reflector element such as the element 20 of FIG. 2, however, the received radiation is reflected in substantial amplitude and with rotation of 45°, plus or minus, depending upon the dipole orientation. Because the dipoles are resonant at the operating frequency of the system, the amplitude of the reflected and re-radiated signals is substantially greater than the amplitude of stray reflections, materially assisting in the necessary maintenance of distinction between the reflected code signals and stray reflections. Furthermore, the polarization rotation effected by the resonant dipoles produces a substantially horizontal component in the reflected and re-radiated signals. As a result, these signals impinging upon the dual antenna 18 produce electrical signals of substantial amplitude in the operating circuits of scanner receiver 19 (FIG. 1) and these signal impulses impart the necessary identification information with respect to the car or other vehicle traversing the scanning station.

The digital signal pulses derived at the scanner receiver 19 are applied to the control unit 29. These signal pulses do not recur at a rate satisfactory for direct processing or read-out, using presently available equipment such as the tape punch 33. Moreover, the pulse rate may vary by as much as 12:1, since the train may move through the scanning station at speeds from five to sixty miles per hour. For this reason, it is desirable to store the data temporarily. This is accomplished by applying the received digital signals to the buffer storage register 31, which may comprise one or more conventional transistor or magnetic core shift registers.

From the buffer storage register 31, the recorded information is read out to the tape punch 33 and is employed to control punching of a tape 41, thereby affording a permanent record of the car identification. In the course of the same read-out of data from register 31, the identification data may be transmitted to a remote location for processing, display, or other use. On the other hand, and particularly if any end use for the information is to take place at the same location as the operating equipment illustrated in FIG. 1, the tape 41 may subsequently be passed through the tape reader 37, with the output from the tape reader being applied through control unit 29 to a suitable data processor or display unit 39. The output from reader 37 may be transmitted to other locations as well as to processor 39. The device 39 may prepare printed records of the cars in a given train or may be employed for other like purposes pertinent to operation of the railroad.

The direction of movement of a given car through the scanning station is not known in advance. Consequently, the system 10 provides for identification of each car, from the data carried by the identification plates 14 on the car, regardless of the direction in which the car moves. This is accomplished by adding a coded reflector member at each end of the identification plate 14, one of these additional coded reflector members being provided with a unique code to indicate movement of the car in one direction and the other being encoded with a different unique code to indicate movement in the opposite direction. For example, the end reflector member for the plate 14 may be encoded with the binary code 10101 to indicate that the car is moving in one direction, when this code is read first in the scanning of the identification plate. The opposite end reflector member of the identification plate can be encoded, for example, as 01010 to indicate that the car is moving in the opposite direction. With such additional code data on the identification plates, it is a relatively simple matter to provide the control unit 29 with suitable circuits for identifying which code symbol has first appeared in the digital signal derived by scanning of a given car and to control the readout from buffer store 31 to tape punch 33 to place the code characters in the proper sequence on the punch tape 41.

The coded reflector member 20, with the slot dipoles 22, 24, 26 and 28, is of substantial advantage in distinguishing the code signal pulse from extraneous reflections of the microwave signals as they impinge upon other parts of the railroad cars 12. The slot dipoles, however, also re-radiate the microwave signals in a direction away from the scanning station as well as toward the scanning station. Under some conditions, the backwardly-directed radiations from one slot may excite an adjacent slot dipole and produce a fairly strong spurious signal. This effect is minimized by the construction for the coded reflector member 20 illustrated in FIG. 3.

Thus, to minimize the backward radiation from the dipole antennas, the reflector member 20 is provided with a backing 31 of a material that absorbs microwave frequency radiations. A number of such absorbent materials are known and are commercially available. This construction obviates errors that might otherwise arise from spurious signals caused by transmission of the radiations from one slot to another.

In the modified construction shown in FIG. 3, it should also be noted that the individual reflector members containing the slot dipoles are not combined in a single physically unified plate but rather are constructed as separate individual dipole plates or reflector elements 33 assembled together to form the reflector member 20. This construction has the advantage that no more than two different forms of dipole plate are required, whereas the construction shown in FIG. 2 entails the manufacture of a distinctively different reflector member for each different character to be encoded in the identification system.

The arrangement of FIG. 3 is more economical from the standpoint of reduction in the stock of parts required to assemble new identification plates and the number of different kinds of reflector members that must be manufactured. However, use of physically separate reflector elements 33, as shown in FIG. 3, requires greater knowledge on the part of the person assembling the identification plates 14, since that person must be fully cognizant of the binary code employed in order to prepare the correct sequence of dipoles for each character. The arrangement of FIG. 2, with the alpha-numeric symbol on the composite reflector member containing several reflector elements, allows somewhat more effective assembly and checking of identification plates by unskilled personnel.

In those instances where the radiation-absorbent material 31 is affixed to each individual reflector element 33, front-to-back reversal of the elements is impractical because the absorbent material would thus face outwardly of the assembly. This difficulty can be eliminated by using reflector elements 33 of square configuration. The reflector element can then be re-positioned by rotation through an angle of 90° to reverse the orientation of the dipole slot. This retains the position of the absorbent material at the back of the dipole, and permits assembly of any desired code combination using only a single form of reflector element.

FIG. 4 illustrates one manner in which the code reflector members may be assembled to form the identification plate 14. Thus, the identification plate may include a suitable frame member 32 attached to the wheel carriage or other suitable location on the railroad car. The coded reflector members 20, with or without a radiation-absorbent backing, are inserted in the frame to assemble the complete identification plate. Of course, an analogous arrangement can be used with the individual reflector elements 33 (FIG. 3), assembling the code character reflector members directly in frame member 32.

FIG. 5 illustrates another form of coded reflector member that may be employed in the system of the present invention. The reflector member shown in this figure comprises a sheet of radiation-absorbent material 40, one face of which initially carries a thin continuous sheet of conductive material. The conductive material is selectively etched or otherwise cut away to afford a series of strips or strands 42, 44 of one-half wave length and of the desired orientation. Thus, the strips or strands 42 and 44 constitute the individual reflector elements in this form of the reflector member. The conductive strips, like the dipoles discussed hereinabove, are made resonant at the operating frequency of the scanning system. Thus, they reflect the impinging vertically polarized microwave signals with a 45° rotation of polarization, the direction of rotation being dependent upon the orientation of the strips. Stray reflections are reduced by the absorbent material 40 appearing between and behind the resonant reflectors. Of course, individual wire elements mounted on the backing 40 can be employed in the same manner as conductive strips 42, 44.

Figure 6:
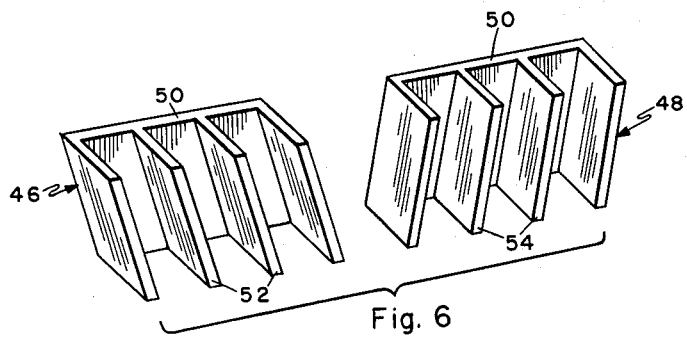
FIG. 6 is a perspective view of a further embodiment of coded reflector members constructed in accordance with the present invention.

Another embodiment of the coded reflector member construction is illustrated in FIG. 6. Here, the coded reflector members 46 and 48 each comprise a conductive structure having a base plate 50 and a plurality of extending parallel plates 52 and 54, respectively. The depth of the slots between the plates 52 and 54 is selected to provide a time delay of one-quarter wavelength between the signal reflected from the front edge of the plate and the signal reflected from the base member. Vertically polarized microwave signals impinging upon the members 46 and 48 are reflected as right and left-hand circularly polarized signals respectively, which can be clearly distinguished by appropriate antenna structures incorporated in the dual receiving antenna 18.

If desired, the coded reflector members may be provided with a protective coating of a material that is essentially transparent to microwave radiation. For example, a layer of polytetrafluoroethylene or other suitable plastic may be applied to the surfaces of the reflector members to protect them against adverse weather conditions. The polytetrafluoroethylene plastic and similar materials are of particular advantage because they afford a surface which tends to reject contamination due to rain, snow, dust and the like, due to their essentially non-adhesive properties. Thus, attenuation or scattering due to the presence of surface contamination may be minimized.

In some instances, it may be desirable to modify the system to show the type of car passing through the scanning station, determining whether it is a box car, a refrigerator car, a locomotive, a gondola, or other car or vehicle. This information can be incorporated in the coded data presented by the identification plate 14 affixed to the car. Indeed, the identification plate may be encoded to represent the data on which the car requires servicing, the type of cargo contained by the car, and other such information. Thus, computing equipment at the central office can be provided with information enabling it to list all cars due for servicing as of a given time, or can list all cars carrying a particular type of cargo, or all cars constituting unloaded refrigeration cars. Of course, a balance must be maintained between the amount of information incorporated in the identification plates and the length required for such plates in order to avoid an excessive burden on the system in the form of undue extension of the identification plate length.

In the foregoing description, the individual reflector elements have been shown oriented at angles of plus and minus 45° to the vertical to distinguish code "zeros" from code "ones." It will be recognized, however, that other angles may be employed for this purpose. It is preferable, however, that the slots be perpendicular to each other to afford maximum distinction at the receiving antenna 18 and the receiver circuits 19. That is, orientation of the slots perpendicular to each other permits the most precise discrimination between the re-radiated signals from the dual angled dipoles.

It is even possible to use horizontally and vertically oriented reflector dipoles as the reflector elements in the system. These particular orientations are not especially desirable, however. Horizontal movement of the train can introduce distortion into the reflected signals sufficient to degrade the signals-to-noise ratio and hence may prevent adequate discrimination between the re-radiated signals. Furthermore, the spaces between adjacent reflector members or individual reflector elements in the identification plates 14 may function as vertical slot antennas, re-radiating the impinging signals in a manner such as to introduce spurious pulse signals at the receiving antenna.

While linear coding reflector elements are preferable these elements may comprise other geometrical figures such as ellipses, ovals, and the like. Alternatively, the reflector elements may be in the form of helices, spirals, or any other shapes which, in addition to the embodiment of FIG. 6, will produce circularly or elliptically polarized signals. Resonant reflector elements producing, for example, right- and left-circularly polarized signals to represent binary "ones" and "zeros," respectively, may give added improvement in the signal-to-noise ratio.

As will be evident from the foregoing description, the identification apparatus of the present invention affords a number of distinct advantages over previously known systems. The coded reflector members that make up the identification plates are simple and inexpensive to manufacture and may be readily mass produced. The identification plates to be mounted on the rolling stock constitute passive code elements and do not require amplifiers, power supplies, or like devices. As a consequence, virtually no maintenance is necessary with respect to the identification members on the cars. The equipment at the scanning stations is simple and inexpensive and requires a minimum of maintenance. Finally, car identity information is immediately available at a central office, where it may be used to up-date a running inventory of the railroad stock or for any other required purpose.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. A coded identification member for use in an automatic object identifying system comprising a scanning station including a source of radiant energy signals of given wavelength, radiating means for radiating said signals with a first predetermined polarization, and receiving means for receiving radiant energy signals of said given wavelength but limited to reception of signals having a second and substantially different polarization, said identification member comprising:
    a plurality of individual reflector elements arranged in a predetermined code sequence, each effective to reflect impinging radiant energy signals of said given wavelength but with said second polarization;
    and means for mounting said reflector elements on an object to be identified in position to intercept and re-radiate said radiant energy signals from said radiating means back to said receiving means when said object is in predetermined position relative to said scanning station.

2. A coded identification member according to claim 1 for use in an object identifying system in which said signal source is a microwave signal generator and in which said transmitting and receiving means each comprise a microwave antenna, said reflector elements each comprising an electrically conductive element dimensioned to reflect microwave signals of said given wavelength and oriented to change the polarization of the reflected signal to said second polarization.

3. An identification member according to claim 2 in which each of said reflector elements comprises a conductive metal sheet having a dipole slot therein that is one-half wavelength in length and less than one-quarter wavelength in width.

4. An identification member according to claim 2 in which each of said reflector elements comprises a radiation-absorptive backing supporting a conductive dipole structure.

5. An identification member according to claim 1 in which said reflector elements are grouped in distinct code groups each representative of a given alpha-numeric character, and in which each such group is constructed as a unitary reflector member.

6. An identification member according to claim 1 in which individual ones of said reflector elements are disposed perpendicular to each other to distinguish between differing code values.

7. A coded identification member for use in an automatic object identifying system comprising a scanning station including a source of radiant energy signals at a given frequency, transmitter means coupled to said signal source for radiating said signal with a given initial polarization, and receiver means sensitive to a second and substantially different polarization, said identification member comprising:
    a plurality of individual reflector elements;
    and means for mounting said reflector elements on an object to be identified in a predetermined code sequence, in position to intercept and re-radiate said radiant energy signals from said transmitter means back to said receiver means with a substantial change in polarization to said second polarization.

8. A coded identification member for an automatic vehicle identification system employing short-range microwave scanning of individual vehicle identification members, comprising:
    a plurality of individual reflector dipoles, resonant at a given microwave frequency, arranged in a predetermined alignment and spacing sequence in accordance with a given binary code to afford a unique code identification for a vehicle.

9. A coded identification member for an automatic vehicle identification system employing short-range microwave scanning of individual vehicle identification members, comprising:
    a plurality of individual linear reflector dipoles, each having a length of one-half wavelength and a width less than one-quarter wavelength at a given microwave frequency, arranged in a predetermined alignment and spacing sequence in accordance with a given binary code to afford a unique code identification for a vehicle.

10. A coded identification member for an automatic object identification system employing short-range microwave scanning of individual object identification members, comprising:
    a plurality of individual reflector elements each including a conductive base plate and a plurality of parallel conductive elements projecting therefrom through a distance of approximately one-fourth wavelength;
    and means for mounting said reflector elements in a predetermined alignment and spacing sequence, according to a given binary code, to afford a unique code identification for an object constituting circularly polarized microwave radiations.

References Cited by the Examiner

Microwaves Identify Freight Cars, by O. F. Hamann et al., Control Engineering, vol. 9, No. 3, March 1962, pages 102–104 relied upon.

CHESTER L. JUSTUS, *Primary Examiner.*

P. M. HINDERSTEIN, *Assistant Examiner.*